United States Patent Office 3,748,295
Patented July 24, 1973

3,748,295
LOW-TEMPERATURE CURING POLYMERS AND LATICES THEREOF
Bela K. Mikofalvy, Sheffield Lake, and Donald P. Knechtges, Middleburg Heights, Ohio, assignors to The B. F. Goodrich Company, New York, N.Y.
No Drawing. Original application June 10, 1970, Ser. No. 45,208, now Patent No. 3,682,871, dated Aug. 8, 1972. Divided and this application Jan. 19, 1972, Ser. No. 216,819
Int. Cl. C08f 29/54, 33/02, 29/18
U.S. Cl. 260—29.6 TA                8 Claims

ABSTRACT OF THE DISCLOSURE

Vinylidene halide polymers capable of being cured at low temperatures are prepared by the emulsion polymerization of one or more vinylidene halide monomers with a carboxylic acid monomer and an N-alkylol amide monomer in an aqueous system. The resulting polymers develop optimum or near optimum physical properties upon curing at room temperature or at temperatures up to about 225° F.

This is a divisional of application Ser. No. 45,208, filed June 10, 1970, now U.S. Pat. No. 3,682,871, granted Aug. 8, 1972.

BACKGROUND OF THE INVENTION

Synthetic polymer latices derived from acrylic esters can be made self-curing, i.e., capable of being cured at elevated temperatures without the addition of external curing agents. The alkyl acrylate latices typically have reactivity present in the polymer which is obtained by the polymerization of minor proportions of one or more reactive monomers with the alkyl acrylate monomers. These acrylate compositions may be cured without the use of conventional curing agents and have a long shelf life in the uncured state.

It would be highly advantageous to obtain self-curing vinylidene halide polymer latices. Heretofore it has not been known to introduce such reactivity into vinylidene halide polymers since the reactive monomers conventionally employed are not, under the usual emulsion polymerization condition, compatible with the polymerization of vinyl chloride or vinylidene chloride. The reactivity ratio of these reactive monomers is so markedly different than that of vinyl chloride that introducing such monomers with vinyl chloride would normally shortstop the polymerization or at least inhibit the polymerization so as to make it impracticable.

SUMMARY OF THE INVENTION

We have now discovered vinylidene halide polymers, self-curable at low temperatures, obtained by the emulsion polymerization in an aqueous medium of one or more vinylidene halide monomers with a carboxylic acid monomer and an N-alkylol amide monomer. Additionally one or more other polymerizable comonomers may be included with the above-mentioned monomers. About 35.0% to 99.8% by weight, based on the total monomers, of the vinylidene halide monomer(s) is polymerized with about 0.1% to 25% by weight of the carboxylic acid monomer and about 0.1% to 5% by weight of the N-alkylol amide monomer. Up to about 64.8% by weight of one or more other polymerizable comonomers, particularly esters of acrylic acid or methacrylic acid, vinyl acetate, acrylonitrile, methacrylonitrile, acrylamide or methacrylamide, styrene or bis(β-haloalkyl)vinyl phosphonates, can be polymerized therewith.

The present invention is especially significant since in addition to obtaining a self-curable vinylidene halide polymer it has also, quite unexpectedly, been found that the polymers cure at much lower temperatures than has been possible with self-curing acrylic polymers. In some instances, room temperature cures are obtained. Ability to cure the polymer at low temperatures to obtain optimum physical properties is especially important with vinyl halide-containing polymers since these polymers discolor if exposed to elevated temperatures—the extent of discoloration depending on the vinyl halide content, the temperature and the length of exposure. Under extreme conditions these polymers may even degrade to such a point that hydrogen halide is evolved. It is, therefore, essential that if vinyl halide-containing polymers are to be cured, the cure temperature must be below the temperature at which such discoloration and degradation sets in. This invention is even more advantageous since the polymers can be appreciably cured at even room temperature, since this results in very definite economic advantages and also broadens the applicability.

DETAILED DESCRIPTION

The polymers of the present invention which are curable at low temperatures down to about room temperature are obtained by the emulsion polymerization of one or more vinylidene halide monomers with a carboxylic acid monomer and an N-alkylol amide monomer in an aqueous system.

The vinylidene halide monomers correspond to the structural formula

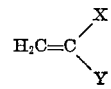

wherein X is a halogen selected from the group consisting of chlorine, bromine or fluorine and Y is hydrogen or a halogen the same as defined for X. Especially useful vinylidene halide monomers are vinyl chloride and vinylidene chloride. The vinylidene halide monomers may be employed individually or in combination to make up the useful latices of this invention. In general, the amount of vinylidene halide monomer(s) polymerized will range from about 35.0% to 99.8% by weight based on the total monomers. Excellent low-temperature curable polymer latices are obtained when the bound vinylidene halide monomer is present in an amount between about 40% and 90% by weight.

Polymerized with the vinylidene halide monomer(s) is an olefinically unsaturated carboxylic acid monomer containing at least one carbon-carbon double bond susceptible to polymerization and at least one carboxyl group. Acids with the double bond in the α,β-position with respect to the carboxyl group

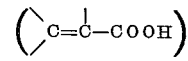

or with a terminal methylene grouping ($H_2C=C<$) are especially useful by virtue of their ready availability and ease of polymerization. Typical olefinically unsaturated carboxylic acid monomers useful in the present invention include such widely divergent materials as acrylic acid, methacrylic acid, ethacrylic acid, α-chloroacrylic acid, α-cyanoacrylic acid, crotonic acid, β-acryloxy propionic acid, hydrosorbic acid, sorbic acid, α-chlorosorbic acid, cinnamic acid, β-styryl acrylic acid, hydromuconic acid, muconic acid, glutonic acid, aconitic acid and the like. Excellent results are obtained with α,β-olefinically unsaturated monocarboxylic acid monomers containing from 3 to 6 carbon atoms. Mixtures of two or more of the above-mentioned carboxylic acid monomers may be employed to prepare the present polymer latices. It may also be useful for the present invention to employ acid anhydrides formed by the elimination of one molecule of water from two carboxyl groups located on the same polycarboxylic acid molecule, such as maleic anhydride and the like.

Polymerized with the vinylidene halide and carboxylic acid monomers is an α,β-olefinically unsaturated N-alkylol amide of the structural formula

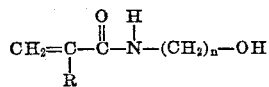

wherein R is hydrogen or an alkyl group containing from 1 to 4 carbon atoms and $n$ is an integer from 1 to 4. N-alkylol amides of the above type include N-methylol acrylamide, N-ethanol acrylamide, N-propanol acrylamide, N-methylol methacrylamide, N-ethanol methacrylamide and the like.

The amount of carboxylic acid monomer will range between about 0.1% and 25% by weight based on the total monomers. Preferably, the amount of the acid monomer employed will be between about 0.5% and 5% by weight. The present polymer latices contain from about 0.1% to 5% by weight of the N-alkylol amide polymerized. Excellent results have been obtained when the N-alkylol acrylamide ranges between 0.5% to 3% by weight. When preparing the low-temperature curable latices it is generally found that polymers having excellent low temperature curability are obtained when the combined weight of the carboxylic acid monomer and N-alkylol amide monomer is maintained below about 5% by weight. It is often convenient to employ the carboxylic acid monomer and N-alkylol amide monomer on an equal weight basis, however, this is not essential to the success of the present invention and these monomers may be employed in any ratio with relation to each other so long as the individual monomers are present in an amount as described above.

The polymer latices of the present invention can contain up to about 64.8% by weight of one or more polymerizable comonomers. Such polymerizable comonomers include: conjugated dienes such as butadiene, isoprene and piperylene; α-olefins such as ethylene, propylene, isobutylene, butene-1, 4-methylpentene-1; vinyl esters such as vinyl acetate; vinyl aromatics such as styrene, α-methyl styrene, vinyl toluene, vinyl naphthalene; alkyl vinyl ethers such as methylvinyl ether, isobutyl vinyl ether, n-butyl vinyl ether and isobutyl vinyl ether; N-alkoxyalkyl amides of α,β-olefinically unsaturated carboxylic acids such as N-methoxymethyl acrylamide, N-methoxyethyl acrylamide, N-butoxymethyl acrylamide, N-butoxymethyl methacrylamide and the like; amides of α,β-olefinically unsaturated carboxylic acids such as acrylamide, methacrylamide, N-methyl acrylamide, N-t-butyl acrylamide, N-methyl methacrylamide, N-ethyl methacrylamide, diacetone acrylamide and the like; acrylonitrile, methacrylonitrile and cyanoalkyl acrylates such as α-cyanomethyl acrylate and the α-, β- and γ-cyanopropyl acrylates; esters of α,β-olefinically unsaturated carboxylic acids such as methyl acrylate, ethyl acrylate, methyl methacrylate, 2-ethylhexyl acrylate, cyclohexyl acrylate and phenyl acrylate; polyfunctional monomers such as methylene bisacrylamide, ethyleneglycol dimethacrylate, diethyleneglycol diacrylate, allyl pentaerythritol and divinyl benzene; bis(β-haloalkyl)alkenyl phosphonates such as bis (β-chloroethyl)vinyl phosphonate; and the like.

Excellent results are obtained when the polymerizable comonomers are present in an amount between about 10% and 59.8% by weight based on the total monomers. One or more of the above-mentioned polymerizable comonomers may be employed in the present invention so long as the vinylidene halide monomer, the carboxylic acid monomer and the N-alkylol amide monomer are present in the above-defined amounts. Thus, it is evident that a wide range of chemical compositions are embodied in the present invention depending on the particular polymer properties desired.

Although the present invention encompasses a wide variety of useful polymers and latices thereof it has been found especially useful to include one or more esters of acrylic acid or methacrylic acid having the formula

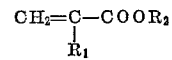

wherein $R_1$ is hydrogen or a methyl group and $R_2$ represents an alkyl radical having from 1 to 12 carbon atoms with the vinylidene halide, carboxylic acid and N-alkylol amide monomers. Representative monomers of this type include methyl acrylate, ethyl acrylate, the propyl acrylates and the butyl acrylates, 2-methylhexyl acrylate, n-octyl acrylate, 2-ethylhexyl acrylate, lauryl acrylate, methyl methacrylate, ethyl methacrylate, octyl methacrylate and the like and derivatives thereof such as ethoxyethyl acrylate. When about 10% to 59.8% by weight of said acrylic or methacrylic esters are incorporated in the polymer latices of the present invention, low-temperature curable polymers having excellent physical properties and a wide variety of useful applications are obtained.

It is often advantageous when employing the acrylic and methacrylic esters to also include one or more other polymerizable comonomers to obtain a useful balance of physical properties. Especially useful comonomers employed in conjunction with the acrylic and methacrylic esters are vinyl acetate, acrylonitrile or methacrylonitrile, acrylamide or methacrylamide, styrene and bis(β-chloroethyl)vinyl phosphonate. The bis(β-chloroethyl)vinyl phosphonate comonomer, for example, is especially advantageous if increased flame retardancy is desired. Acrylonitrile will be employed for applications requiring a polymer which is resistant to solvents. Up to about 40% by weight of these comonomers can advantageously be employed with the acrylic or methacrylic esters.

The polymers embodied herein are prepared employing conventional polymerization techniques in an aqueous medium with a suitable polymerization catalyst. Over-polymerization of the monomers may also be employed. The polymer may be present in the latex in an amount up to about 55% total solids.

The aqueous medium may be emulsifier-free or it may contain an emulsifier. When emulsifiers are used to prepare the latices of this invention, the general types of anionic and nonionic emulsifiers will be employed. Excellent results have been obtained when anionic emulsifiers are employed. Useful anionic emulsifiers include alkali metal or ammonium salts of the sulfates of alcohols having from 8 to 18 carbon atoms such as sodium lauryl sulfate; ethanolamine lauryl sulfate, ethylamine lauryl sulfate; alkali metal and ammonium salts of sulfonated petroleum and paraffin oils; sodium salts of aromatic sulfonic acids such as dodecane-1-sulfonic acid and octadiene-1-sulfonic acid; aralkyl sulfonates such as sodium isopropyl benzene sulfonate, sodium dodecyl benzene sulfonate and sodium isobutyl naphthalene sulfonate; alkali metal and ammonium salts of sulfonates dicarboxylic acid esters such as sodium dioctyl sulfosuccinate, disodium-n-octadecyl sulfosuccinamate; alkali metal or ammonium salts of free acid of complex organic mono- and diphosphate esters; and the like. Nonionic emulsifiers such as octyl- or nonylphenyl polyethoxyethanol may also be used. Latices having excellent stability are obtained with the alkali metal and ammonium salts of aromatic sulfonic acids, aralkyl sulfonates and long chain alkyl sulfonates.

If an emulsifier is used it may range up to about 6% or more by weight based on the monomers. The emulsifier may be entirely added at the outset of the polymerization or it may be added incrementally or by proportioning throughout the run. Typically, a substantial amount of the emulsifier is added at the outset of the polymerization and the remainder charged incrementally or proportionately to the reactor as the monomers are proportioned.

The polymerizations are conducted at temperatures from about 20° C. to about 100° C. in the presence of a compound capable of initiating the polymerizations. Commonly used free radical initiators include the various peroxygen compounds such as persulfates, benzoyl peroxide, t-butyl hydroperoxide, cumene hydroperoxide, t-butyl diperphthalate, pelargonyl peroxide and 1-hydrocyclohexyl hydroperoxide; azo compounds such as azodiisobutyronitrile and dimethylazodiisobutyrate; and the like. Particularly useful initiators are the water-soluble peroxygen compounds such as hydrogen peroxide and the sodium, potassium and ammonium persulfates used by themselves or in an activated redox system. Typical redox systems include alkali metal persulfates in combination with a reducing substance such as polyhydroxyphenols and oxidizable sulfur compounds such as sodium sulfite or sodium bisulfite, a reducing sugar, dimethylamino propionitrile, a diazomercapto compound and a water-soluble ferricyanide compound or the like. Heavy metal ions may also be used to activate the persulfate catalyzed polymerization. Low-temperature curable polymer latices having excellent stability and low amounts of coagulum are obtained with alkali metal and ammonium persulfate polymerizations. The amount of initiator used will generally be in the range between about 0.1% and 3% by weight based on the total monomers and preferably is between about 0.15% and 1% by weight. The initiator may be charged completely at the outset of the polymerization; however, incremental addition or proportioning of the initiator throughout the polymerization may also be employed and is often advantageous.

While the pH of the polymerization system is not critical it is preferred that a pH of 7 or below be maintained during the polymerization. The polymer latex may subsequently be adjusted to any desired pH.

Typical polymerizations for the preparation of the low-temperature curable polymer latices are conducted by charging the reactor with the appropriate amount of water and electrolyte, if any is to be employed, a portion of the emulsifier and a portion of the initiator sufficient to initiate the polymerization. The reactor is then evacuated, heated to the initiation temperature and charged with a portion of the monomer premix which is previously prepared by mixing water, emulsifier, the monomers and polymerization modifiers, if any are employed. After the initial monomer charge has been allowed to react for a period of time the proportioning of the remaining monomer premix is begun, the rate of proportioning being varied depending on the polymerization temperature, the particular initiator employed and the amount of vinylidene halide monomer being polymerized. After all the monomer premix has been charged the final addition of initiator is made and the reactor and the latex heated with agitation for a length of time necessary to achieve complete conversion. The reactor is then vented, cooled and the latex filtered to remove any coagulum formed during the reaction.

The polymer latices of this invention are useful in leather finishing; as binders for nonwoven fabrics; for impregnating and coating textile fabrics composed of synthetic and/or natural fibers; for the impregnation and coating of papers; as metal coatings and primers; as abrasion coatings; and as adhesive compositions for the lamination of a wide variety of materials. The polymer latices are particularly useful for providing improved wet strength and internal bond strength for papers and nonwoven fabrics impregnated therewith and these improved properties are obtained at lower cure temperatures than has heretofore been possible. The low-temperature curability is particularly advantageous since it results in increased production rates with improved economics. Also, it eliminates or minimizes objectionable discoloration obtained with vinylidene halide-containing polymer latices.

In general, the latex form of the polymer is most useful for coating, impregnating and dipping operations. The latex may be used as such, it may be diluted to lower solids content, or it may be blended with other dispersions or polymer latices prior to use. It may be blended with thickeners or bodying agents to improve the flow properties of the latex for subsequent application.

The rubbery and plastic polymers embodied herein are useful as foams or as materials for gaskets, footwear, flooring, gloves and the like. The polymers of this invention may be isolated from the latex by coagulation with the conventional alcohol or salt-acid coagulants or they may be coagulated employing freeze agglomeration techniques.

The following examples serve to illustrate the invention more fully. All parts and percentages expressed in the examples are given on a weight basis unless otherwise indicated.

EXAMPLE I

A pressure vessel was charged with 366 parts water, 0.5 part sodium lauryl sulfate and 0.2 part potassium persulfate. The reactor was evacuated three times to about 100 mm. Hg, heated to about 50° C. and charged with 5% of a monomer premix comprised of 30 parts water, 3.5 parts sodium lauryl sulfate and 0.3 part of a mercaptan modifier, 40 parts vinyl chloride, 56 parts n-butyl acrylate, 2 parts acrylic acid and 2 parts N-methylol acrylamide. After the initial portion of the monomer premix was charged and allowed to react for about 30 minutes the remainder of the monomer premix was proportioned into the reactor over a 12-hour period. When the proportioning was completed, 0.15 part potassium persulfate dissolved in 4 parts water was charged and the latex agitated at 50° C. for an additional 8 hours to insure complete monomer conversion. The reactor was then vented, allowed to cool and the resulting latex (pH 2.3) filtered. The latex had excellent stability with no coagulum and contained about 20% total solids.

The latex was then diluted to about 15% total solids by the addition of water and 10-mil flat paper floated on the latex for 10 seconds, first on one side and then on the other. The saturated paper was drip-dried at room temperature and samples cured over a range of temperatures from 225° F. to 325° F. Physical properties were measured on cured 1" x 6" paper samples. Tensile strengths were determined for the dried paper samples, for paper samples soaked in water for a minimum of 16 hours (reported as wet tensile strength) and for samples soaked in perchloroethylene for 20 minutes (reported as solvent tensile strength). The tensiles were measured on an Instron Tensile Tester at a rate of pull of 5 centimeters per minute. Tensile strengths (pounds/inch) were as follows:

|  | Dry tensile | Wet tensile | Solvent tensile |
|---|---|---|---|
| 5 min. cure at: | | | |
| 225° F | 76 | 33 | 57 |
| 275° F | 84 | 33 | 55 |
| 3 min. cure at 325° F | 72 | 25 | 45 |

Additional testing was conducted on a film cast from the above polymer latex. The latex was thickened to a sufficient viscosity, to cast a 15-mil film with a drawbar on a glass plate. The film was dried at room temperature, stripped and cured at various temperatures. Physical properties of the film specimens (1" x 6") were measured with an Instron Tensile Tester at a rate of 20 inches per minute. Tensile strength and elongation of film samples cured at room temperature, 5 minutes at 250° F. and 5 minutes at 300° F. are as follows:

|  | Ultimate tensile | Percent elongation | 100% modulus | 300% modulus |
|---|---|---|---|---|
| Room temperature cure | 1,050 | 440 | 653 | 947 |
| 5 min. cure at: | | | | |
| 250° F | 950 | 275 | 580 | |
| 300° F | 890 | 350 | 438 | 775 |

The ability of the polymers of the present invention to cure at low temperatures is evident from the above data. Optimum tensile strength for polymer films is obtained upon curing at room temperature. Curing the film at elevated temperatures gave no particular improvement of the physical properties but only resulted in discoloration of the film. The data also indicate that maximum solvent tensile strength and wet tensile strength was obtained with papers impregnated with the latex after only 5 minutes curing at 225° F. No advantage is obtained in curing the papers at higher temperatures.

Similar results were obtained with polymers and polymer latices when vinylidene chloride was substituted for vinyl chloride, methacrylic acid was substituted for acrylic acid and N-propanol acrylamide was substituted for N-methylol acrylamide.

EXAMPLE II

Vinyl chloride (88 parts) was polymerized with 10 parts ethyl acrylate, one part acrylic acid and one part N-methylol acrylamide. The same procedure as employed in the previous example was used except that the total water present was 95 parts; the total initiator used was 0.4 part; 0.5 part electrolyte (tetrasodium pyrophosphate) was used with no mercaptan modifier; the polymerization temperature was 50° C.; and the proportioning of the monomer premix was over a 16-hour period. A coagulum-free latex containing over 50% total solids was obtained. The latex after dilution to 15% total solids was used to saturate paper samples cured from room temperature up to 325° F. and tested as described in Example I. The tensile data obtained for the dry paper samples and paper samples exposed to perchloroethylene are as follows:

|  | Dry tensile | Solvent tensile |
|---|---|---|
| Cured at room temperature | 26 | 21 |
| 5 min cure at: | | |
| 225° F | 47 | 30 |
| 250° F | 53 | 38 |
| 275° F | 46 | 40 |
| 3 min. cure at 325° F | 55 | 41 |

A high state of cure is already present at 225–250° F. with papers saturated with this latex without the use of catalysts.

EXAMPLE III

A series of polymerizations were conducted with a variety of monomers to prepare useful low-temperature curable polymer latices having widely divergent compositions. The polymerizations were conducted following the general procedure described in Example I. The recipes employed for the various polymerizations are set forth in Table I. The polymers obtained from these runs all had physical characteristics making them suitable for impregnation, coating or film applications. Additionally most of the polymers developed optimum or near optimum physical properties with a room temperature cure. With all the above polymer compositions a very high percentage of the ultimate tensile value was developed after curing at 250° F. for 3 to 5 minutes. For example, with papers saturated with the polymer latex of Run L the following tensile data was obtained.

|  | Dry tensile | Wet tensile | Solvent tensile |
|---|---|---|---|
| Cured at room temperature | 55 | 3 | 16 |
| 5 min. cure at: | | | |
| 225° F | 62 | 20 | 23 |
| 250° F | 62 | 26 | 30 |
| 275° F | 62 | 28 | 32 |
| 3 min. cure at 325° F | 62 | 29 | 31 |

Film physicals for the polymer of the same run were as follows:

|  | Ultimate tensile | Percent elongation | 100% modulus | 300% modulus |
|---|---|---|---|---|
| Cured at room temperature | 1,945 | 480 | 175 | 525 |
| 5 min. cure at: | | | | |
| 250° F | 2,208 | 470 | 191 | 566 |
| 275° F | 2,237 | 475 | 170 | 481 |
| 300° F | 2,242 | 455 | 185 | 565 |

TABLE I

| Run | A | B | C | D | E | F | G | H | I | J | K | L | M | N | O | P |
|---|---|---|---|---|---|---|---|---|---|---|---|---|---|---|---|---|
| Monomers (parts): | | | | | | | | | | | | | | | | |
| Vinyl chloride | 40 | 40 | 40 | | 40 | 20 | 40 | 40 | 40 | 40 | 40 | 40 | 40 | 40 | 74 | 98 |
| Vinylidene chloride | | | | 40 | 25 | 45 | | | | | | | | | 24 | |
| Ethyl acrylate | 30 | 35 | | | 29 | 29 | | | | | 14.8 | | | 5 | | |
| n-Butyl acrylate | | | 56 | 56 | | | 54.8 | 54.5 | | | | 54.8 | 57.8 | | | |
| 2-ethylhexyl acrylate | | | | | | | | | 54.8 | | | | | | | |
| Ethoxyethyl acrylate | | | | | | | | | | 54.8 | 40 | | | 49 | | |
| Acrylonitrile | 3 | 20 | | | 3 | 3 | 3 | 3 | 3 | 3 | 3 | 3 | | | | |
| Vinyl acetate | 24 | | | | | | | | | | | | | | | |
| Acrylic acid | 1.2 | 1.2 | 2 | 2 | 1.2 | 1.2 | 1.2 | 1.2 | 1.2 | 1.2 | 1.2 | 1.2 | 1.2 | 1.2 | 1 | 1 |
| N-methylol acrylamide | 1.8 | 1.8 | 2 | 2 | 1.8 | 1.8 | 1.0 | 1.5 | 1.0 | 1.0 | 1.0 | 1.0 | 1.0 | 1.8 | 1 | 1 |
| Emulsifier (parts): | | | | | | | | | | | | | | | | |
| Nonylphenoxypoly(ethyleneoxy)ethanol | 2.55 | 2.55 | | | 2.55 | 2.55 | 2.5 | 2.5 | 2.5 | 2.5 | 2.5 | 2.5 | 2.5 | 2.5 | 2.5 | 2.5 |
| Straight chain divinyl benzene sodium sulfonate | 2.55 | 2.55 | | | 2.55 | 2.55 | 2.5 | 2.5 | 2.5 | 2.5 | 2.5 | 2.5 | 2.5 | 2.5 | 2.5 | 2.5 |
| Sodium salt of lauryl sulfate | | | 4 | 4 | | | | | | | | | | | | |
| Electrolytes (parts): | | | | | | | | | | | | | | | | |
| Sodium sulfate | 0.4 | 0.4 | | | 0.4 | 0.4 | | | | | | | | | | |
| Tetrasodium pyrophosphate | | | | | | | 1.0 | 1.0 | 1.0 | 1.0 | 0.4 | | | 0.4 | 0.4 | 0.5 |
| Initiator (parts): | | | | | | | | | | | | | | | | |
| Potassium persulfate | 0.3 | 0.3 | 0.35 | 0.35 | 0.3 | 0.3 | 0.3 | 0.4 | 0.4 | 0.4 | 0.3 | 0.4 | 0.4 | 0.5 | 0.5 | 0.4 |
| Latex pH | 2.6 | (*) | 2.5 | 2.8 | 2.2 | 2.3 | 4.2 | 4.3 | (*) | 4.7 | 2.9 | 2.3 | 2.3 | 2.8 | 3 | (*) |
| Latex total solids (percent) | 46.3 | (*) | 18.5 | 31.7 | 50.6 | 51.1 | 50.8 | 47.8 | 49.0 | 49.3 | 51.0 | 40.6 | 40.7 | 51.3 | 52 | (*) |

* Not determined.

EXAMPLE IV

Employing a similar polymerization procedure to that described previously, 50 parts vinylidene chloride, 35 parts n-butyl acrylate, 12 parts bis(β-chloroethyl)vinyl phosphonate, 3 parts acrylic acid and 1.5 parts N-methylol acrylamide were polymerized and the resulting latex tested as a saturant for paper in accordance with the previously described procedures. The physical properties of papers saturated with this latex, and also of polymer films cast from the latex, were measured and found to be at or near their optimum after 225° F. (3 to 5 minutes) cures. In addition to the low-temperature curability of these polymers, the polymers and paper and fabric compositions impregnated therewith exhibited a high degree of flame retardancy. Flame retardancy was demonstrated on both the films and on fiber glass samples saturated with the latex. Fifteen mil polymer films were cast, dried at room temperature and 2¼" x 6" samples cut and hung in a metal frame so that the films were in a vertical position. A match was held at the bottom of the sample for 12 seconds and the flammability and nature of the char recorded. Similar testing was done on fiber glass cloth which was saturated with the latex. The time from ignition to flame-out was recorded and the length of char determined. In all instances the polymer containing the bis(β-chloroethyl)vinyl phosphonate performed better than similar polymer compositions without the phosphonate monomer.

EXAMPLE V

To demonstrate the versatility of the present process and the polymer latices obtained thereby, n-butyl acrylate, vinyl chloride, acrylic acid and N-methylol acrylamide were polymerized employing the conventional copolymerization technique and the polymer latex identified as polymer Latex Q. Vinyl chloride was also overpolymerized in an emulsion system on an n-butyl acrylate/acrylic acid/N-methylol acrylamide base polymer and the resulting polymer latex identified as Latex R. The overall composition of both polymers Q and R was:

|  | Percent |
|---|---|
| n-Butyl acrylate | 56 |
| Vinyl chloride | 40 |
| Acrylic acid | 2 |
| N-methylol acrylamide | 2 |

Ten-mil paper was saturated with both polymer latices and the physical properties measured after curing. The data was as follows:

| | Saturant | |
|---|---|---|
| | Latex Q | Latex R |
| Percent polymer pick-up | 48.9 | 48.5 |
| Dry tensile strength (pounds/inch): | | |
| 5 min. cure at 225° F | 57.7 | 62.0 |
| 5 min. cure at 275° F | 53.0 | 63.0 |
| 5 min. cure at 325° F | 43.5 | 57.5 |
| Percent elongation (dry): | | |
| 5 min. cure at 225° F | 6.6 | 7.6 |
| 5 min. cure at 275° F | 5.6 | 7.2 |
| 5 min. cure at 325° F | 3.7 | 6.5 |
| Wet tensile strength (pounds/inch): | | |
| 5 min. cure at 225° F | 27.5 | 26.0 |
| 5 min. cure at 275° F | 25.5 | 27.0 |
| 5 min. cure at 325° F | 16.5 | 25.7 |
| Solvent tensile strength (pounds/inch): | | |
| 5 min. cure at 225° F | 26.1 | 35.0 |
| 5 min. cure at 275° F | 24.3 | 37.0 |
| 5 min. cure at 325° F | 22.6 | 36.0 |

We claim:

1. An aqueous dispersion of a copolymer of (1) from 35.0% to 99.8% by weight based on the total monomers of a vinylidene halide monomer of the formula

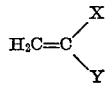

wherein X is a halogen selected from the group consisting of chlorine, bromine and fluorine and Y is hydrogen or the same as X; polymerized with (2) from 0.1% to 25% by weight of an olefinically unsaturated monocarboxylic acid monomer containing from 3 to 6 carbon atoms wherein the double bond is $\alpha,\beta$ to the carboxyl group or is a terminal methylene group; (3) from 0.1% to 5% by weight of an $\alpha,\beta$-olefinically unsaturated N-alkylol amide of the formula

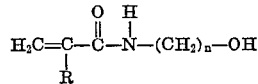

wherein R is hydrogen or an alkyl group containing from 1 to 4 carbon atoms and $n$ is an integer from 1 to 4, and (4) up to 64.8% of one or more other polymerizable comonomers selected from the group consisting of conjugated dienes, $\alpha$-olefins, vinyl esters, vinyl aromatics, alkyl vinyl ethers, N-alkoxyalkyl amides of $\alpha,\beta$-olefinically unsaturated carboxylic acids, amides of $\alpha,\beta$-olefinically unsaturated carboxylic acids, acrylonitrile, methacrylonitrile, cyanoalkyl acrylates, esters of $\alpha,\beta$-olefinically unsaturated carboxylic acids and bis($\beta$-haloalkyl)alkenyl phosphonates.

2. A dispersion of claim 1 wherein (1) is vinyl chloride or vinylidene chloride and is present in an amount from 40% to 90% by weight.

3. A dispersion of claim 2 wherein (2) is present in an amount from 0.5% to 5% by weight and (3) is present in an amount from 0.5% to 3% by weight.

4. A dispersion of claim 3 wherein the copolymer contains an ester of acrylic acid or methacrylic acid of the formula

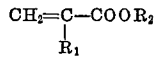

wherein $R_1$ is hydrogen or a methyl group and $R_2$ represents an alkyl group having from 1 to 12 carbon atoms.

5. A dispersion of claim 4 wherein the copolymer contains up to about 40% by weight of a comonomer selected from the group consisting of vinyl acetate, acrylonitrile, methacrylonitrile, acrylamide, methacrylamide, styrene, and bis($\beta$-chloroethyl)vinyl phosphonate is polymerized, (2) is an $\alpha,\beta$-olefinically unsaturated, monocarboxylic acid containing from 3 to 6 carbon atoms and is present in an amount from 0.5% to 5% by weight and (3) is present in an amount from 0.5% to 3% by weight.

6. A dispersion of claim 2 wherein (2) is acrylic acid and (3) is N-methylol acrylamide and the combined weight of (2) and (3) is below about 5% by weight of the total monomers.

7. A dispersion of claim 4 wherein (2) is acrylic acid and (3) is N-methylol acrylamide and the combined weight of (2) and (3) is below about 5% by weight of the total monomers.

8. A dispersion of claim 5 wherein (2) is acrylic acid and (3) is N-methylol acrylamide and the combined weight of (2) and (3) is below about 5% by weight of the total monomers.

References Cited

UNITED STATES PATENTS 3,361,695   1/1968   Wilhelm et al. ___ 260—29.6 TA

HAROLD D. ANDERSON, Primary Examiner

L. M. PHYNES, Assistant Examiner

U.S. Cl. X.R.

260—29.6 RW, 80.71, 80.73, 80.6, 80.75, 80.7, 80.8, 80.81; 117—139.5